United States Patent [19]

Khan et al.

[11] Patent Number: 5,188,739
[45] Date of Patent: Feb. 23, 1993

[54] DISPOSAL OF SEWAGE SLUDGE

[75] Inventors: Motasimur R. Khan, Wappingers Falls, N.Y.; Richard B. Zang, Sandy Hook, Conn.; Christine C. Albert, Peekskill, N.Y.

[73] Assignee: Texaco Inc., White Plains, N.Y.

[21] Appl. No.: 801,326

[22] Filed: Dec. 2, 1991

[51] Int. Cl.$^5$ .............................................. B01D 37/00
[52] U.S. Cl. ..................... 210/770; 210/609; 210/751; 210/768; 210/774; 210/781; 48/197 A
[58] Field of Search ............. 210/767, 770, 774, 768, 210/603, 761, 783, 611, 769, 609, 751; 44/280, 605, 603, 611, 628; 48/210, 197 A, 346; 110/229

[56] References Cited

U.S. PATENT DOCUMENTS

| | | |
|---|---|---|
| 3,507,788 | 4/1970 | Cole et al. ............................ 210/774 |
| 3,549,529 | 12/1970 | Wiseman ............................... 210/761 |
| 3,687,646 | 8/1972 | Brent et al. ............................ 48/209 |
| 4,306,978 | 12/1981 | Wurtz ................................... 210/750 |
| 4,657,681 | 4/1987 | Hughes et al. ........................ 210/770 |
| 4,762,527 | 8/1988 | Beshore et al. ....................... 44/605 |
| 4,840,736 | 6/1989 | Sander et al. ......................... 210/770 |
| 4,933,086 | 6/1990 | McMahon et al. ................... 210/603 |
| 4,983,296 | 1/1991 | McMahon et al. ................... 210/769 |
| 5,017,196 | 5/1991 | Dewitz ................................. 48/210 |
| 5,037,561 | 8/1991 | Copeland ............................. 210/770 |

Primary Examiner—Robert A. Dawson
Assistant Examiner—Ana M. Fortuna
Attorney, Agent, or Firm—James J. O'Loughlin; Albert Brent

[57] ABSTRACT

A process for disposing of sanitary sewage sludge by producing a pumpable slurry of sewage sludge and solid carbonaceous fuel e.g. coal, petroleum coke, rubber. The slurry is burned as a fuel in a partial oxidation gas generator, furnace, or boiler. In the process, an aqueous slurry of sewage sludge is concentrated by removing water by means of a conventional belt filter press or presses. The dewatered slurry of sewage sludge is hydrothermally treated and cooled and depressurized. The viscosity of the slurry of sewage sludge is reduced to less than about 2000 centipoise by shearing. The sheared sewage sludge is then ground together with a solid carbonaceous fuel to produce a pumpable slurry which is burned with a free-oxygen containing gas in a partial oxidation gasifier, furnace, boiler, or incinerator to produce a hot raw effluent gas stream. In a preferred embodiment, the effluent gas stream is cleaned and purified and non-contaminating ash and slag are separated. By this process, noxious sewage sludge may be disposed of without contaminating the environment. By-product synthesis gas, reducing gas, or fuel gas may be produced.

26 Claims, No Drawings

DISPOSAL OF SEWAGE SLUDGE

FIELD OF THE INVENTION

This invention relates to the disposal of sanitary sewage sludge by producing a pumpable slurry of sewage sludge and solid carbonaceous fuel and burning said slurry as fuel in a furnace, boiler, or a gasifier.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which concentrated aqueous slurries of sewage sludge are subjected to a hydrothermal treatment, and shearing to produce a pumpable slurry that is coground with a solid carbonaceous fuel from the group consisting of coal, petroleum coke, rubber, and mixtures thereof to produce a feed for burning in a partial oxidation gasifier, furnace, boiler, or incinerator.

SUMMARY OF THE INVENTION

This invention pertains to an improved process for disposing of sanitary sewage sludge comprising:

(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %. Alternatively, a conventional and/or an advanced centrifuge could be used to achieve solid content in this range;

(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;

(3) heat treating said dewatered slurry of sewage sludge from (2) in said hydrothermal treating zone in the absence of air and at a temperature in the range of about 120° F. to 550° F. and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;

(4) holding the heated sewage sludge from (3) at a temperature in the range of about 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F; and (8) burning said pumpable slurry of sewage sludge and solid carbonaceous fuel from (7) in a partial oxidation gasifier, furnace, boiler, or incinerator to produce a hot raw effluent gas stream.

In one embodiment to avoid contaminating the environment, the effluent gas stream from (8) is cleaned, purified, and non-contaminating fly-ash and slag are separated from the gas stream.

DESCRIPTION OF THE INVENTION

Sewage sludge is a heterogeneous mixture of complex organic and inorganic materials. The term "sewage sludge" as used herein may be broadly defined as "water-carried wastes", particularly from municipal sanitary sewage lines, containing at least one of the following: body water (excreta), household wastes, community waste such as street washings, etc., and industrial wastes and sludges. The total solids content of the sewage in municipal lines is usually about 200 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of microorganism may be found in sewage, including bacteria, protozoans, viruses and fungi.

Sewage sludge does not behave as a Newtonian fluid. Accordingly, any analyses of sludge flow behavior in pipes is rather difficult. A major problem is the energy (head) loss in sludge transfer due to friction. Sludge slurries with 10-15% concentration can be pumped provided high friction losses are allowable. The physical state of sludge depends upon the amount of moisture present in the sludge and on the nature of the sludge. As the moisture content decreases, the sludge changes state from a true liquid to a semi-solid and ultimately to a dry solid. Through the use of gravity thickening the sludge could approach 3-5% by weight of solids concentration. However, the void spaces between the particles are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $H_2S$, COS, $CO_2$, a non-polluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed.

A typical ultimate analysis of sewage sludge is shown in Table I. A typical ultimate analysis of inert non-combustible materials in sewage sludge is shown in Table II.

TABLE I

TYPICAL ULTIMATE ANALYSIS OF COMBUSTIBLES IN SEWAGE SLUDGE

| ELEMENT | WT. % |
|---|---|
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
|---|---|
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 10 to 55 wt. % of solids and liquid hydrocarbonaceous or solid carbonaceous fuel that contain sufficient sewage sludge to be profitably burned are ordinarily too viscous to be pumped. This problem and others have been overcome by the subject invention.

Sewage sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The water separated from the sewage sludge may be purified by conventional means. The purified water may be then used subsequently in the process. For example, the water may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 10 to 30 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

In a preferred embodiment of the subject process, an aqueous slurry of sewage sludge having a solids content in the range of about 0.5 to 20 wt. % is concentrated by a first conventional continuous belt filter press, and optionally by a second conventional high intensity belt filter press to produce a slurry of dewatered sewage sludge having a solids content in the range of about 10 to 55 wt. %, such as about 20 to 40 wt. %, say 25 wt. %, and a viscosity in the range of about 10,000 to 1,000,000 centipoise when measured at a temperature of about 180° F. Alternatively, a conventional or an advanced centrifuge could be used to achieve solids content in the range 10 to 55 wt. %.

It was unexpectedly found that the morphology of sewage sludge is changed by said mechanical treatment of the sewage sludge. For example, bound water is released and slurry making is optimized. Slurries containing a higher concentration of solids can be achieved by means of such mechanical dewatering equipment. By means of a conventional continuous belt pressure filter, the aqueous slurry of sewage sludge is pressed between two moving belts that pass between and over rollers. A surface pressure in the range of about 20 to 100 pounds per square inch (psi) for a period in the range of about $\frac{1}{2}$ to 60 minutes, such as about 1 to 30 minutes, say about 3 minutes, and at a temperature in the range of about ambient to 300° F., say about 212° F. to 285° F., is applied to the aqueous slurry of sewage sludge. Liquid water is thereby quickly pressed from the material between the belts. For example, the Andritz Co. Continuous Press Filter (CPF) operating at ambient conditions with a surface pressure of about 20 psi will produce a press cake having a solids content in the range of about 10 to 50 wt. %. Optionally, on discharge from the CPF, the press cake may be optionally further dewatered in a conventional Andritz Co. High Intensity Press (HIP) continuous belt filter press operating with a surface pressure in the range of about 100 to 250 psi for a period in the range of about $\frac{1}{2}$ to 60 minutes, such as about 1–30 minutes, say about 3 minutes, and at a temperature in the range of about ambient to 300° F., say about 212° F. to 285° F. to produce a press cake having a solids content in the range of about 15 to 55 wt. %. If further dewatering is required, prior to filtering in the HIP, the press cake from the CPF is mixed with a conventional inorganic filter additive e.g. compounds of iron, calcium, silicon, and mixtures thereof in the amount of about 5–30 wt. % of the total solids and having a particle size of less than about 2 mm, such as about 1 mm. A typical filter-aid is $CaCO_3$. The solids content of the press cake from the HIP may be thereby increased to about 20 to 60 wt. %.

Preferably, the aforesaid belt filter pressing takes place before any significant bacterial action occurs that consumes carbon and organic materials in the sewage sludge.

The dewatered sludge from the CPF and/or HIP is pumped into a hydrothermal heat treatment reactor by means of a conventional positive displacement pump, such as a Schwing pump. Pumping applies a shear to the dewatered sewage sludge so that its viscosity is reduced to less than about 5000 centipoise when measured at 180° F.

Heat treating of the dewatered slurry of sewage sludge takes place in conventional double tube heat exchangers, spiral exchangers or shell and tube heat exchangers. The highly dewatered sewage sludge is treated at a temperature in the range of about 120° F. to 550° F. in the absence of air and at a pressure which is at or above the vapor pressure of water at the heat treating temperature. For example, the sewage sludge is heated in two double-tube heat exchangers in the following two consecutive stages: (a) heating at a temperature in the range of about 120° F. to 325° F. in the absence of air for a residence time of about 1 to 10 minutes and with a pressure difference from the inlet to outlet of said stage in the range of about 300 to 550 pounds per square inch (psi); (b) followed by heating at a temperature in the range of about 325° F. to 550° F. in the absence of air for a residence time of about 2 to 20 minutes and with a pressure difference from the inlet to outlet of said stage of less than about 100 pounds per square inch.

The hydrothermally treated sewage sludge is held at a temperature in the range of about 450° F. to 550° F. in the absence of air for a residence time of about 2 to 120 minutes and at a pressure which is at or above the vapor pressure of water at said holding temperature to produce a pumpable aqueous slurry of sewage sludge having a viscosity of less than about 600 centipoise when measured at about 180° F.

The previously described dewatered sewage sludge may be heated by direct or indirect heat exchange in an autoclave. For example, steam or partially cooled synthesis gas produced downstream in the partial oxidation process may be passed in direct or indirect heat exchange with the slurry of sewage sludge. Hydrothermally treating and holding the dewatered sewage sludge at a temperature in the range of about 450° F. to 550° F. as previously described causes decarboxylation and dehydrogenation of the sewage sludge. The sewage sludge fibers and gel structure break down. Sewage sludge with a particle size in the range of about 5 to 20 microns is thereby produced. Pumpable aqueous slurries of sewage sludge are thereby produced. Off-gas from the reactor e.g. autoclave, comprising $CO_2$, $H_2O$, $H_2S$ and COS is sent to a conventional odor control unit and/or disinfecting zone. Noxious gases are thereby safely disposed of without polluting the nation's environment.

In one embodiment, hot water at a temperature in the range of about 300° F. to 500° F. may be removed from the reactor and may be used in indirect heat exchange with the slurry of sewage sludge going to the hydrothermal reactor. In another embodiment, at least a portion of the fuel gas produced by the subject partial oxidation mode is used to provide the thermal energy in the aforesaid heat treating step.

In still another embodiment a heat transfer fluid, such as silicone oil, may be used to cool the hydrothermally treated sewage sludge. The hot heat transfer fluid may be then used to preheat the slurry of sewage sludge during the hydrothermal treatment.

After being held as previously described, the hydrothermally treated pumpable aqueous slurry is cooled to a temperature in the range of about ambient to less than about 200° F. The heated sewage sludge at a temperature in the range of about 450° F. to 550° F. may be cooled in one or more stages. For example, in a two stage cooling process, in the first stage the heated sewage sludge is cooled to a temperature in the range of about 200° F. to 300° F. by indirect heat exchange. For example, a heat exchange fluid may be used to cool the hydrothermally treated sewage sludge from the storage tank by indirect heat exchange. The hot heat exchange fluid is then used to heat the slurry of sewage sludge during the hydrothermal treatment. The thermal efficiency of the process is thereby improved. Subsequently, the sewage sludge from the first stage cooler is further cooled in a second stage indirect heat exchanger with water to a temperature of less than about 200° F. A highly pumpable aqueous slurry of dewatered sewage sludge having a solids content in the range of about 10 to 55 wt. % is thereby provided having a higher heating value (HHV) in the range of about 6,000 to 8,000 BTU/Lb. All of the higher heating values expressed herein are on the dry basis for the materials. The pressure in the cooling zone is in the range of about atmospheric pressure to the saturated vapor pressure of water at the temperature in cooling zone. The "trapped" water present in the raw sewage sludge is now separated and provides a slurry with a low viscosity, e.g. 50 cp–600 cp when measured at 180° F.

After being cooled, the heat treated slurry of sewage sludge is sheared at a temperature in the range of about ambient to 212° F., say about 150° F. to 190° F. in the absence of air for a period in the range of about 10 seconds to 180 minutes at a shear rate of about 0.5 to 360 $sec^{-1}$. A sheared highly pumpable fluid sewage sludge is thereby produced having viscosity in the range of about 50 centipoise to 600 centipoise when measured at 180° F. The shearing may take place in a conventional steam jacketed mixing tank equipped with a propeller which for example may rotate at a speed in the range of about 0.5 to 360 revolutions per minute. Other suitable shearing means may be used. Shearing is a very effective way to improve the slurrying characteristics and solids content of dewatered sewage sludge. More extensive shearing of sewage sludge is discussed in coassigned U.S. Pat. Nos. 4,933,086 and 4,983,296, which are incorporated herein by reference.

The sheared aqueous slurry of dewatered sewage sludge has a solids content in the range of about 10 to 55 wt. % and has a higher heating value (HHV) in the range of about 6,000 to 8,000 BTU/Lb. The sheared slurry of sewage sludge is pumped to a conventional grinder at a temperature in the range of about ambient to 212° F., such as about 150° F. to 200° F., say about 200° F. in the absence of air.

In the grinder, the sheared aqueous slurry of sewage sludge is ground together with a solid carbonaceous fuel to produce a pumpable homogeneous slurry having a solids content in the range of about 45 to 70 wt. % and a sewage sludge to solid carbonaceous fuel wt. ratio in the range of about 3 to 7 parts by wt. of sewage sludge to 3 to 7 parts by wt. of solid carbonaceous fuel. The viscosity of the pumpable slurry is in the range of about 400 to 2000 centipoise when measured at about 180° F. The solid carbonaceous fuel is selected from the group consisting of coal, petroleum coke, rubber (such as ground rubber tires), and mixtures thereof. While the solid carbonaceous fuel is preferably introduced into the grinder as a dry comminuted material, it may also be introduced into the grinder as a pumpable highly concentrated slurry of solid carbonaceous fuel, such as an aqueous slurry of coal having a solids content of at least about 50 wt. %. After grinding, the solids in the pumpable aqueous slurry of sewage sludge and solid carbonaceous fuel have a particle size so that 100 wt. % passes through ASTM E11 Standard Sieve Designation 1.40 mm.

In one embodiment, a nonionic additive ethoxylated nonylphenol at a concentration of about 0.1 to 5 wt. % of the slurry is introduced into the grinding means to enhance pumpability of the aqueous slurry of sewage sludge and solid carbonaceous fuel.

The pumpable slurry leaving the grinding zone is burned in a partial oxidation gasifier, furnace, boiler, or incinerator to produce an effluent gas stream. In one embodiment, the effluent gas stream is washed and purified. Non-polluting ash and noxious gases are removed by conventional means. Contamination of the environment is prevented.

The term "coal" as used herein is intended to mean a material selected from the group consisting of anthracite, bituminous, lignite, residue derived from coal liquefaction, shale, asphalt, and mixtures thereof. The term "petroleum coke" is used herein in its conventional manner and includes petroleum coke made by conventional delayed or fluid coking processes. The term "and/or" is used herein in its normal sense. For example, "A and/or B" means either A or B, or A and B.

In a preferred embodiment, the fuel feedstream, for example the aqueous slurry of sewage sludge and solid carbonaceous fuel and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference.

The burner assembly is inserted downward through a top inlet port of the non-catalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular-type burner, such as shown and described in coassigned U.S. Pat. Nos. 3,847,564 and 4,525,175, which are incorporated herein by reference, is preferably used to introduce the feedstreams into the partial oxidation gas generator. Other suitable burner designs may be used. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole percent $O_2$, oxygen enriched air i.e. greater than 21 mole percent $O_2$, and air. The free-oxygen containing gas is supplied at a temperature in the range of about 100° F. to 1000°. The aqueous slurry of pretreated sewage sludge and solid carbonaceous fuel e.g. coal and/or petroleum coke is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportions of solid fuels, sewage sludge, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1-300 atmospheres. Preferably the temperature in the gasifier is in the range of about 2200° F. to 2800° F., so that molten slag is produced.

The dwell time in the reaction zone is in the range of about 1 to 10 seconds, and preferably in the range of about 2 to 8 seconds. With substantially pure oxygen feed to the partial oxidation gas generator, the composition of the effluent gas from the gas generator in mole percent dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole percent dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert non-contaminating ash and molten slag.

The hot gaseous effluent stream from the reaction zone of the synthesis gas generator is quickly cooled below the reaction temperature to a temperature in the range of about 325° F. to 550° F. by direct quenching in water, or by indirect heat exchange for example with boiler feed water to produce steam in a gas cooler. Optionally, a portion of said steam or hot synthesis gas may be used in direct or indirect heat exchange to heat the dewatered slurry of sewage sludge in step (3) of claim 1 of the process. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag may be removed by quenching the process gas stream in a conventional quench tank and/or by scrubbing. See coassigned U.S. Pat. Nos. 3,232,728; 3,524,630; and 4,801,307, which are incorporated herein by reference.

Although modifications and variations of the invention may be made without departing from the spirit and scope thereof, only such limitations should be imposed as are indicated in the appended claims.

We claim:
1. A process for disposing of sewage sludge comprising:
(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;
(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;
(3) heat treating said dewatered slurry of sewage sludge from (2) in said hydrothermal treating zone in the absence of air and at a temperature in the range of about 120° F. to 550° F. and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;
(4) holding the heated sewage sludge from (3) at a temperature in the range of about 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.; and (8) burning said pumpable slurry of sewage sludge and solid carbonaceous fuel from (7) in a partial oxidation gasifier, furnace, boiler, or incinerator to produce a hot raw effluent gas stream.

2. The process of claim 1 wherein said solid carbonaceous fuel is selected from the group consisting of coal, petroleum coke, rubber, and mixtures thereof.

3. The process of claim 1 where in step (5) said heat treated slurry of sewage sludge from (4) is passed in indirect heat exchange with a heat transfer fluid in a first heat exchange zone thereby heating said heat transfer fluid and reducing the temperature of the slurry of sewage sludge to a temperature in the range of about 200° F. to 300° F.; and then passing the partially cooled slurry of sewage sludge in indirect heat exchange with a heat transfer fluid in a second heat exchange zone thereby reducing the temperature of the slurry of sewage sludge to less than 200° F.

4. The process of claim 3 wherein said hot heat transfer fluid from said first heat exchange zone is passed in indirect heat exchange to heat said slurry of sewage sludge in (3).

5. The process of claim 1 wherein additional dewatering is provided by pressing said sewage sludge in (1) (a) and/or (b) while in admixture with a filter-aid having a particle size of less than 2 mm, and with or without steam.

6. The process of claim 5 wherein said filter-aid is selected from the group consisting of iron compounds, calcium compounds, silicon compounds, and mixtures thereof.

7. The process of claim 5 wherein the filter-aid is $CaCO_3$ and is added in the range of about 5 to 30 wt. % of the total solids.

8. The process of claim 1 wherein said concentrating in (1) takes place before any significant bacterial action occurs that consumes carbon and organic materials in said sewage sludge.

9. The process of claim 1 wherein the sewage sludge in (3) is heated to the desired temperature by direct or indirect heat exchange with steam or synthesis gas.

10. The process of claim 9 wherein said steam is produced downstream in the process by indirect heat exchange between boiler feed water and said hot raw effluent gas stream from (8).

11. The process of claim 1 wherein water at a temperature in the range of about 300° F. to 500° F. is produced in the reaction zone of (3), and said water is separated from the sewage sludge and passed in indirect heat exchange with the slurry of sewage sludge going into said hydrothermal treating zone.

12. The process of claim 1 wherein said effluent gas stream from (8) is cleaned, purified, and non-contaminating fly-ash and slag are separated from the stream of gases.

13. The process of claim 1 wherein the shearing means in (6) comprises a steam jacketed mixing tank equipped with a propeller.

14. The process of claim 13 wherein said shearing takes place at a temperature in the range of ambient to 212° F. in the absence of air for a period in the range of about 10 seconds to 180 minutes to produce a pumpable homogeneous slurry of sewage sludge.

15. A process for the partial oxidation of sewage sludge comprising:

(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;

(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;

(3) heat treating said dewatered slurry of sewage sludge from (2) in said hydrothermal treating zone in the absence of air and at a temperature in the range of about 120° F. to 550° F. and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;

(4) holding the heated sewage sludge from (3) at a temperature in the range of about 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.;

(8) introducing said pumpable slurry of sewage sludge and solid carbonaceous fuel from (7) into the reaction zone of a partial oxidation gas generator by way of one passage of a multi-passage burner while simultaneously passing through at least one other passage of said burner a stream of free-oxygen containing gas; and (9) reacting said materials in said partial oxidation reaction zone in (8) at a temperature in the range of about 1800° F. to 3500° F. and at a pressure in the range of about 1-300 atmospheres to produce a hot raw effluent gas stream comprising at least one of the following: synthesis gas, reducing gas and fuel gas.

16. The process of claim 15 provided with the step of disinfecting a stream of off-gas from the hydrothermal treating zone in (3).

17. The process of claim 15 wherein additional dewatering is provided by pressing said sewage sludge in (1) while in admixture with a filter-aid having a particle size of less than about 2.0 mm, and with or without steam.

18. The process of claim 15 wherein the slurry of sewage sludge in (3) is heated to the desired temperature by direct or indirect heat exchange with steam.

19. The process of claim 18 wherein said steam is produced downstream in the process by indirect heat exchange between boiler feed water and said hot raw effluent gas stream from (9).

20. A pumpable fuel comprising a slurry of sewage sludge and a solid carbonaceous fuel selected from the group consisting of coal, petroleum coke, rubber, and mixtures thereof made by the process of:

(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;

(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;

(3) heat treating said dewatered slurry of sewage sludge from (2) in said hydrothermal treating zone in the absence of air and at a temperature in the range of about 120° F. to 550° F. and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;

(4) holding the heated sewage sludge from (3) at a temperature in the range of about 450° F. to 550° F. in the absence of air for a residence time of about 2 to 120 minutes and at a pressure which is at or above the vapor pressure of water at said holding temperatures, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.

21. The pumpable slurry of sewage sludge and solid carbonaceous fuel of claim 20 provided with the step of burning said fuel in a partial oxidation gas generator, furnace, boiler, or incinerator.

22. A process for disposing of sewage sludge comprising:
(1) concentrating an aqueous slurry of sewage sludge having a solids content in the range of about 0.5 to 20 wt. % by removing water therefrom by means of (a) a first conventional belt filter pres whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press (a) in a conventional high intensity continuous belt filter press operating with a surface pressure in the range 100 to 250 psi for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;
(2) pumping by means of a conventional positive displacement pump said dewatered slurry of sewage sludge from (1) into a hydrothermal treating reactor wherein by said pumping action the viscosity of said dewatered slurry is reduced to less than about 5,000 centipoise when measured at about 180° F.;
(3) heating treating said dewatered slurry of sewage sludge from (2) in said hydrothermal treating zone in the absence of air and at a pressure which is at or above the vapor pressure of water at said heating treating temperature in the following two successive stages: (a) heating in a first double-tube heat exchange means at a temperature in the range of about 120° F. to 325° F. for a residence time of about 1 to 10 minutes, wherein the pressure difference across the first heat exchange means is in the range of about 300 to 550 psi; and (b) followed by heating in a second double-tube heat exchange means at a temperature in the range of about 325° F. to 550° F. in the absence of air for a residence time of about 2 to 20 minutes, the pressure difference across the second heat exchange is less than about 100 psi;
(4) holding the heated sewage sludge from (3) at a temperature in the range of abut 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;
(5) cooling the heat treated slurry of sewage sludge from (4) to a temperature in the range of about ambient to less than about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;
(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;
(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3–7 parts by wt. of sewage sludge to 3–7 parts by wt. of solid carbonaceous fuel and a viscosity of less than about 2000 centipoise when measured at about 180° F.; and
(8) burning said pumpable slurry of sewage sludge and solid carbonaceous fuel from (7) in a partial oxidation gasifier, furnace, boiler, or incinerator to produce a hot raw effluent gas stream.

23. A process for disposing of sewage sludge comprising:
(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;
(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;
(3) heat treating said dewatered slurry of sewage sludge from (2) in said hydrothermal treating zone comprising an autoclave while said sewage sludge is in direct or indirect contact with the stream or with synthesis gas produced downstream in the process and in the absence of air at a temperature in the range of about 129° F. to 550° F., and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) followed by heating at a temperature in the range of about 325° F. to 550° F. in the absence of air for a residence time of about 2 to 20 minutes;
(4) holding the heated sewage sludge from (3) at a temperature in the range of about 450° F. to 550° F.

in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.; and (8) burning said pumpable slurry of sewage sludge and solid carbonaceous fuel from (7) in a partial oxidation gasifier, furnace, boiler, or incinerator to produce a hot raw effluent gas stream.

24. A process for disposing of sewage sludge comprising:

(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in
the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;

(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;

(3) heat treating said dewatered slurry of sewage sludge from (2) in said hydrothermal treating zone in the absence of air and at a temperature in the range of about 120° F. to 550° F., and at a pressure which is at or above the vapor pressure of water at said heat treating temperature in the following two stages; (a) heating at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;

(4) holding the heated slurry of sewage sludge from (3) at a temperature in the range of about 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means in admixture with the additive ethoxylated nonylphenol in the amount of about 0.1 to 5 wt. % of the slurry to enhance the pumpability of the aqueous slurry of sewage sludge and solid carbonaceous fuel, thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.; and (8) burning said pumpable slurry of sewage sludge and solid carbonaceous fuel from (7) in a partial oxidation gasifier, furnace, boiler, or incinerator to produce a hot raw effluent gas stream.

25. A process for disposing of sewage sludge comprising:

(1) concentrating an aqueous slurry of sewage sludge having a solids content in the range of about 0.5 to 20 wt. % by removing water therefrom by means of (a) a first conventional belt filter press whereby said slurry of sewage sludge is carried on a continuous belt and a surface pressure in the range of about 20 to 100 psi is applied to said sewage sludge at a temperature in the range of about ambient to 300° F. for a period in the range of about ½ to 60 minutes; and (b) with or without additional pressing of the material from the first belt filter press in (a) in a conventional high intensity continuous belt filter press operating with a surface pressure in the range 100 to 250 psi for a period in the range of about ½ to 60 minutes, such as about 1 to 30 minutes, and at a temperature in the range of about ambient to 300° F.; wherein a dewatered slurry of sewage sludge is produced having a total solids content in the range of about 10 to 55 wt. %;

(2) pumping by means of a conventional positive displacement pump said dewatered slurry of sewage sludge from (1) into a hydrothermal treating reactor wherein by said pumping the viscosity of said dewatered slurry is reduced to less than about 5,000 centipoise when measured at about 180° F.;

(3) heat treating said dewatered slurry of sewage sludge from (2) in said hydrothermal treating zone comprising an autoclave while said sewage sludge is in direct or indirect heat exchange with steam produced downstream in the process while in the absence of air and at a temperature in the range of about 120° F. to 325° F. in the absence of air for a residence time of about 1 to 10 minutes; followed by (b) heating at a temperature in the range of about 325° F. to 550° F. in the absence of air for a residence time of about 2 to 20 minutes;

(4) holding the heated sewage sludge from (3) at a temperature in the range of about 450° F. to 550° F. in the absence of air for a residence time of about 2 to 120 minutes and at a pressure which is at or above the vapor pressure of water at said holding temperature, to produce a pumpable aqueous slurry of sewage sludge having a viscosity of less than about 600 centipoise when measured at about 180° F.;

(5) cooling the heat treated slurry of sewage sludge from (4) to a temperature in the range of about ambient to less that about 200° F.; thereby providing a highly pumpable aqueous slurry of dewatered sewage sludge having a solids content in the range of about 10 to 55 wt. %, and a higher heating value (HHV) in the range of about 6,000 to 8,000 BTU/LB;

(6) shearing the slurry of sewage sludge from (5) in a shearing means at a temperature in the range of about ambient to 212° F. in the absence of air for a period in the range of about 10 seconds to 180 minutes to produce a sheared highly pumpable fluid sewage sludge having a viscosity in the range of about 50 centipoise to 600 centipoise when measured at about 180° F.;

(7) grinding together the sheared sewage sludge from (6) with a solid carbonaceous fuel in a grinding means thereby producing a pumpable slurry of sewage sludge and solid carbonaceous fuel having a solids content in the range of about 45 to 70 wt. %, a wt. ratio in the range of about 3-7 parts by wt. of sewage sludge to 3-7 parts by wt. of solid carbonaceous fuel and a viscosity of less than about 2000 centipoise when measured at about 180° F.; and (8) introducing said pumpable slurry of sewage sludge and solid carbonaceous fuel from (7) into the reaction zone of a partial oxidation gas generator by way of one passage of a multi-passage burner while simultaneously passing through at least one other passage of said burner a stream of free-oxygen containing gas; and (9) reacting said materials in said partial oxidation reaction zone in (8) at a temperature in the range of about 1800° F. to 3500° F. and at a pressure in the range of about 1-300 atmospheres to produce a hot raw effluent gas stream comprising at least one of the following: synthesis gas, reducing gas and fuel gas.

26. The process of claim 1 where in step (1) said aqueous slurry of sewage sludge is concentrated to a total solids content in the range of about 10 to 55 wt. % by means of a conventional and/or an advanced centrifuge in place of said belt filter pressing.

* * * * *